Feb. 5, 1929.　1,701,142

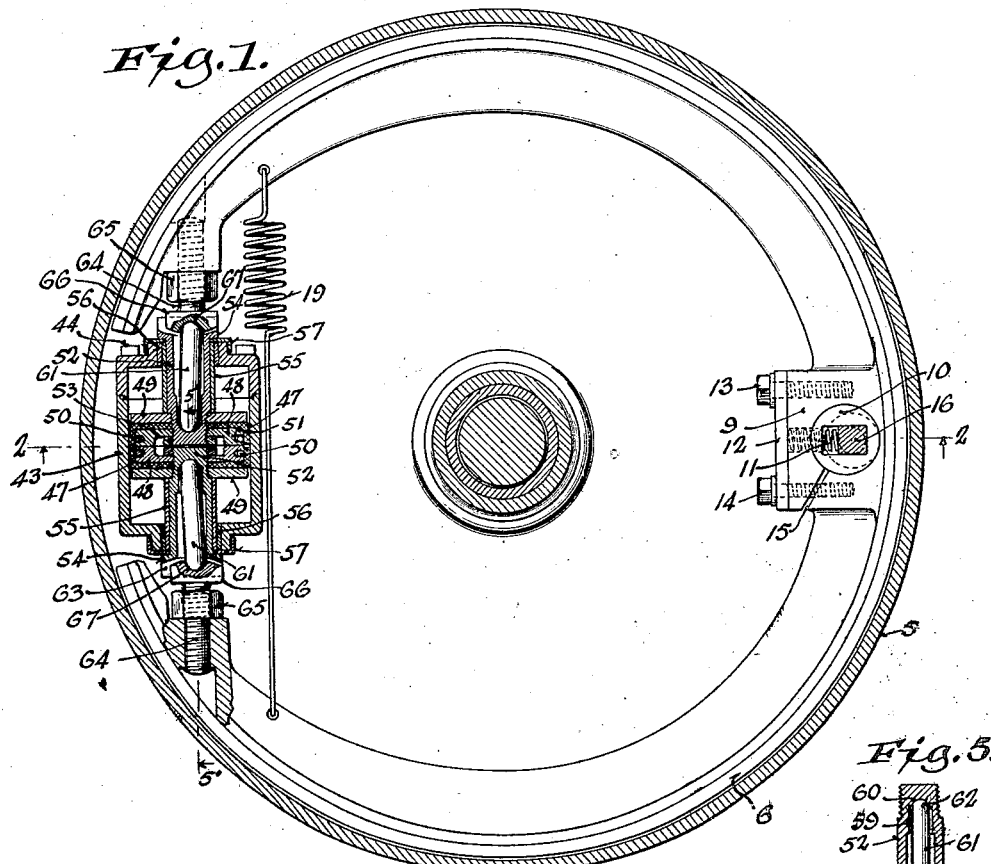
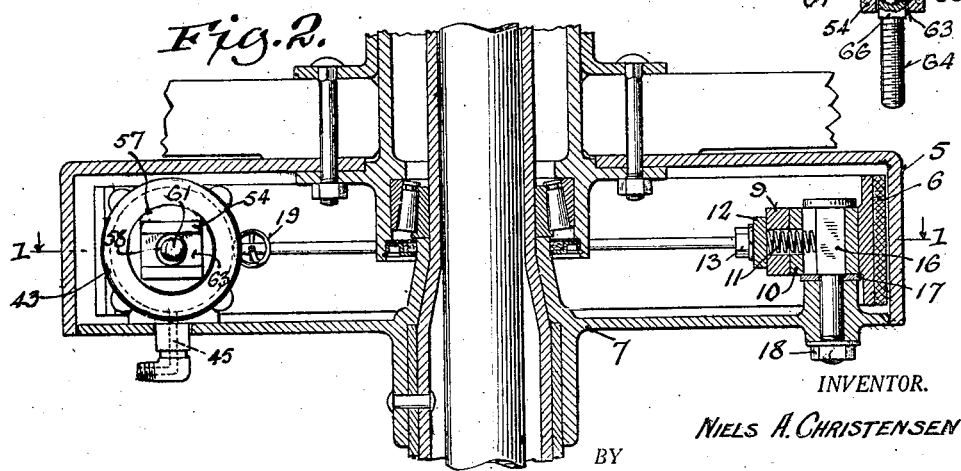

N. A. CHRISTENSEN

BRAKE MECHANISM

Filed Dec. 8, 1924　3 Sheets-Sheet 2

INVENTOR.

NIELS A. CHRISTENSEN.

BY Quarles & French

ATTORNEYS.

Feb. 5, 1929.
N. A. CHRISTENSEN
1,701,142
BRAKE MECHANISM
Filed Dec. 8, 1924
3 Sheets-Sheet 3
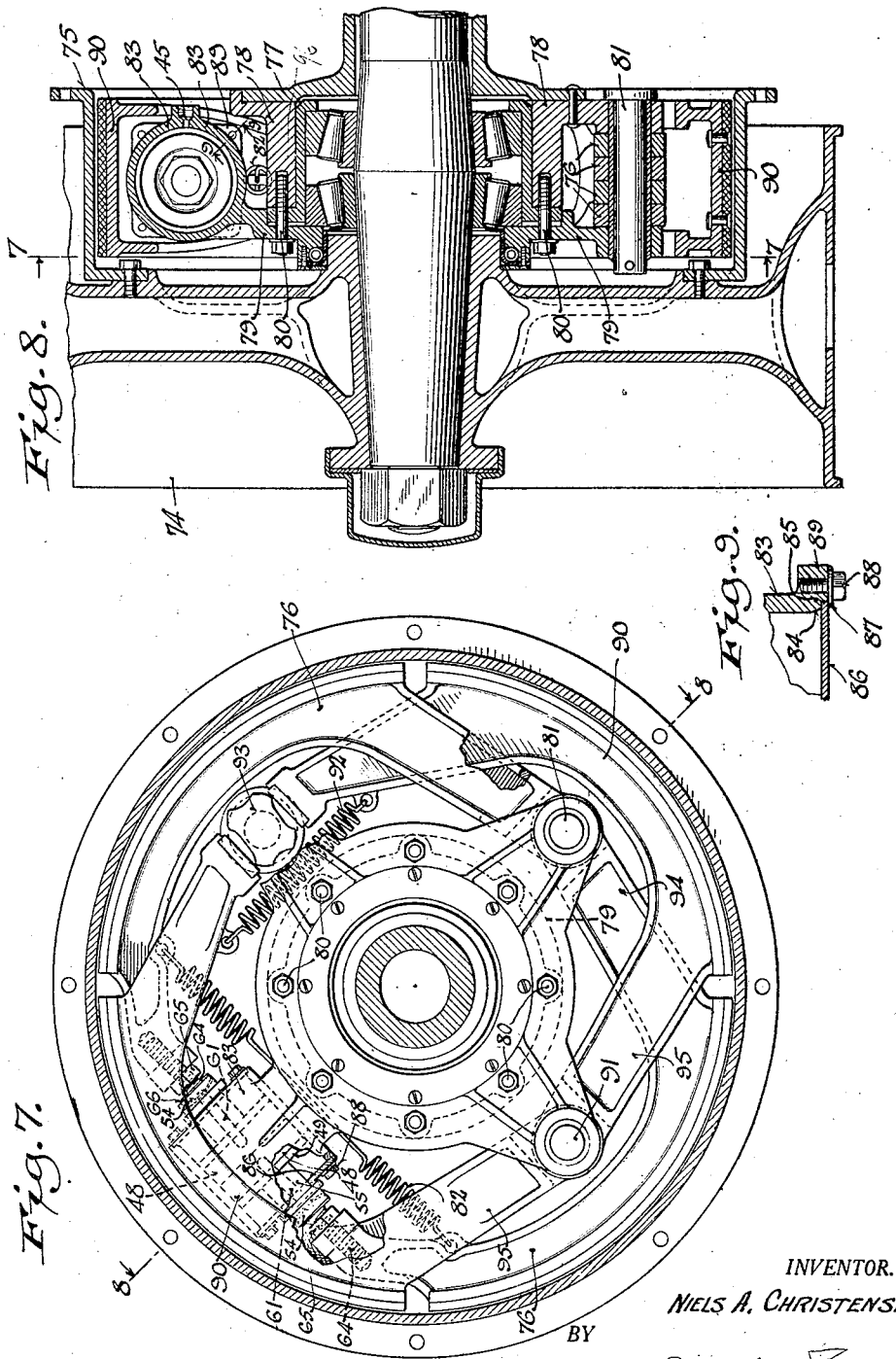
INVENTOR.
NIELS A. CHRISTENSEN.
BY
Quarles & French
ATTORNEYS.

Patented Feb. 5, 1929.

1,701,142

UNITED STATES PATENT OFFICE.

NIELS A. CHRISTENSEN, OF MILWAUKEE, WISCONSIN.

BRAKE MECHANISM.

Application filed December 8, 1924. Serial No. 754,606.

The invention relates to vehicle brake mechanism, and more particularly to such mechanism for use with automotive vehicles and trailers for such vehicles.

In that type of brake mechanism in which a piston operated upon by fluid pressure transmits its force through a piston rod, either direct to the brake shoe or to a lever or other member associated with said shoe, I have found that the piston does not always keep itself centered in the brake cylinder during its movement because of lateral strains imposed upon it during a brake application, with the result that the packing on the piston wears unevenly and leakage is apt to occur. In order to obviate these disadvantages, I have associated a self-centering thrust member with the piston rod and the shoe or the part in thrust engagement with the shoe so that while the shoe or its associated part, when operated, swings in the arc of a circle and hence changes its position relative to the thrust member, the thrust member will readily accommodate this change and still maintain the thrust substantially central of the piston to prevent its canting in the brake cylinder.

A further object of the invention is to provide a fluid-pressure-operated brake in which the brake cylinder is formed integral with the brake spider.

The invention further consists in the several features hereinafter set forth and more particularly defined by claims at the conclusion hereof.

In the drawings: Fig. 1 is a vertical sectional view through brake mechanism embodying the invention, taken on the line 1—1 of Fig. 2;

Fig. 2 is a section taken on the line 2—2 of Fig. 1;

Fig. 3 is a plan view of brake mechanism embodying the invention, said view being taken as looking into the brake-drum from the wheel side, the fluid pressure brake operating mechanism and parts of said drum being shown in section and the brake-cylinder support being broken away;

Fig. 4 is a section taken on the line 4—4 of Fig. 3;

Fig. 5 is a detail sectional view taken on the line 5'—5' of Fig. 1 and indicated by the arrows;

Fig. 6 is a detail sectional view taken on the line 6'—6' of Fig. 3 and indicated by the arrows;

Fig. 7 is a detail sectional view taken on the line 7—7 of Fig. 8 of brake mechanism embodying the invention, parts being broken away and parts being shown in section;

Fig. 8 is a detail sectional view taken on the line 8—8 of Fig. 7;

Fig. 9 is a detail sectional view taken on the line 9—9 of Fig. 8, through the brake cylinder and its cover.

Referring to Figs. 1 and 2, the numeral 5 designates a brake-drum associated with the wheel of the vehicle, 6 a brake member for engaging said drum, 7 the support for the brake member. The brake member 6 is shown as made of a cast band of metal, having a split intermediate anchor-pin-bearing portion 9 having a bore in which a bushing 10 is mounted, together with a spring 11, and the split parts are clamped to the bushing by a bridge-piece 12 and screws 13 and 14 passing through said piece 12 into the band, the screw 14 passing through the slot 15 of the portion 10. The bushing 10 slidably fits on the squared portion of the anchor pin 16 mounted on the support 7 and is positioned between the head of said pin and adjacent support 7 or the washer 17 adjacent said support by the nut 18. The spring 11 is interposed between the pin 16 and the bridge-piece 12 and normally acts to hold the bushing in such position relative to the pin as to provide clearance between the intermediate portion of the band and the brake-drum. Thus the mid portion of the band is secured to the support so that the free parts of the band may be moved outwardly into engagement with the drum against the action of a spring 19 connected to the free ends of the band, and which normally acts to move said ends to a release position. While said member 6 has been described as a band, because both sides form a part of the band, these sides act generally similar to a pair of brake shoes upon the drum similar to those hereinafter described in connection with Figs. 3 and 4.

In Figs. 3 and 4, which present a modification of the brake mechanism more particularly claimed in my copending application Ser. No. 703,952, filed Apr. 3, 1924, the numeral 20 designates a part of the axle housing, 21 the wheel shaft, 22 the hub of the wheel mounted on said shaft, 23 the brake drum secured by bolts 24 to a flange on said hub, 25 a ball-race mounted in a recess in said housing and secured in position by a retainer plate 26 which is clamped against the outer ring of said race by hook-bolts 27 mounted in the axle housing.

The brake here shown comprises a pair of shoes 28. Each shoe has a pivot-pin-bearing portion 29 at one end and a split lug portion 30 at its other end, and carries spring anchor bolts 31 and 32 adjacent its ends. An arm 33 formed integral with the retainer plate 26 carries the pivot pin 34 having a bearing bushing 35 thereon which receives the bushed bearing portion 36 of the shoes 28 between bearing washers 37 which have inwardly extending flanges 38 seated in annular recesses 39 in the exterior edges of bearing portions 29, said pin being threaded to receive a nut 40 to hold the parts in assembled relationship. The ends of the shoes formed by the bearing portions 29 are held in operative position against the pivot pin or its bearings by a spring 41 anchored at its ends to bolts 31. Thus the shoes are free to turn at one end on a pivot carried by the arm 33 so that their free ends may be moved outwardly to bring the shoes into breaking engagement with the drum, and said ends are normally held in release position by means of a spring 42 anchored at its ends to the bolts 32.

In each instance a fluid-pressure-operated motor is operatively connected to the free ends of the band or shoes for applying the brake. This motor, which is the same for each form of brake mechanism, includes a two-part brake cylinder 43 whose parts are secured together by bolts 44, said cylinder having a central port 45 for the inlet and exhaust of pressure fluid. A pair of opposed suitably packed pistons work in the cylinder in opposite directions, each piston having a packing member 47, of leather or other suitable material, secured between the head 48 and a plate 49, and held against the cylinder by a coiled spring 50 mounted in a groove 51 in the head 48. Each piston is clamped to its piston rod 52 between a shoulder on said rod and a nut 53. Each rod 52 has an enlarged head 54, and to prevent the rods from rusting or oxidizing a brass sleeve 55 fits over each rod between the plate 49 and a part adjacent the shoulder formed by the head 54. Each rod 52 slides in bores in the ends of the cylinder which are bushed by a sleeve 56 and are protected by a cap 57 clamped to the rod between the outer end of the sleeve 55 and the head.

Each piston rod has a large bore 58 and a smaller communicating bore 59 with a specially curved end 60. A cylindrical thrust pin 61 has spherically curved ends 62, one of said ends seating on the curved seat 60 and the other end projecting above the bottom of a transverse slot 63 formed in the head 54 of the piston rod.

In Figs. 1 and 2 the ends of the brake member 6 are threaded to receive adjustable jack-screws 64 which are secured in adjusted position by lock nuts 65. The head 66 of each jack-screw has flat sides to fit into the corresponding slot 63 in the head 54, the end of said head and the bottom of said slot being slightly curved. Thus, the jack-screw and the head 54 of the rod have a tongue-and-groove connection in a plane parallel to the plane of movement of the brake member, and these connections serve as guides to hold the brake member in alinement and prevent lateral movement thereof relative to the piston rods. The head 66 of each jack-screw also has a spherically curved seat 67 formed therein to take the spherically curved projecting end 62 of the thrust pin 61. With this construction, when compressed air or other motive fluid is introduced into the brake cylinder between the pistons, it forces said pistons outwardly and the thrusting force of the pistons is transmitted through the pins 61 to the jack-screws 64 and hence the ends of the brake bands to cause the brake member to engage the drum 5, and the spherical mounting of each pin with its associated jack-screw and piston rod permits of the arcuate travel of the brake member and yet maintains the thrust centrally of the piston so that the cup packing 47 will not wear unevenly and the piston will not be canted in the cylinder. Upon the release of breaking pressure the springs 19 and 11 move the brake band 6 out of engagement with the drum.

In Figs. 3 and 4 the split ends of each brake shoe 28 are provided with an interiorly threaded split bushing 68 adapted to be clamped to the shoe by a clamping bolt 69, and jack-screws 70 are adjustably mounted in these bushings and have the sides of their heads 71 flattened to fit in slots 72 in levers 73. Each lever 73 is pivotally mounted on a pin 74 carried by a bracket 75 secured to or formed integral with the end of the brake cylinder, and the slot 72 is formed intermediate its end, while at its outer end it has a portion forming a tongue 76 which fits into the corresponding slot 63 in the head 48 of the piston rod of the fluid-pressure-operated motor so that lateral movement of the levers 73 relative to the pistons, and the brake shoes 48 relative to said levers, is prevented. The tongue 76 of each lever 73 has a spherically curved seat 77 formed therein to receive the spherically curved end 62 of the thrust pin 61. This construction operates in the same manner as that previously described except that the thrust from the pin 61 is transmitted to the outer ends of the levers 73 and thence to the brake shoes, the pins insuring a proper action of the pistons as the levers 73 move in their arcuate paths. With the levers 73 an increased braking force is applied since the connection of the shoes with said levers is closer to the fulcrum than the connection between said levers and the pistons of the fluid-pressure-operated motor.

In Figs. 7 to 9, inclusive, the numeral 74 designates the wheel of the vehicle. 75 the brake drum, 76 brake shoes engageable with said drum, 77 the axle housing, and 78 and 79 brake spiders or supports secured to the axle housing 4, the parts 78 and 79 being separable and secured together by bolts 80.

The brake shoes 76 are each pivotally connected at one end to a pin 81 mounted in arms of the spiders 78 and 79 and are normally held in a released position by a spring 82 secured at its ends to lugs on the free ends of said shoes.

The fluid-pressure-operated motor in this instance includes a brake cylinder 83 which is formed integral with the spider 79 and has an annular curved portion 84 at each end of the bore to permit ready insertion of the packed pistons and merging into an annular recess 85 upon which a cover 86 is seated. Each cover 86 is held in place by washers 87 which project over the edges of the plate and are held thereagainst by bolts 88 mounted on lugs 89 integral with the end portions of the cylinder, as shown in detail in Fig. 9. The pistons, their mounting in the covers 86, the thrust pins and the connections of the pistons and thrust pins with the free ends of the shoes 76 are the same as shown in Fig. 1 and therefore similarly designated.

Additional braking mechanism is also shown in Figs. 7 and 8, in the form of a mechanically-operated brake comprising U-shaped brake members or shoes 90 pivotally mounted at one of their ends on a pin 91 in arms of the spiders 78 and 79 similar to the mounting for the shoes 76 shown in sectional detail in Fig. 8, and held in release position by a spring 92 and set by an oscillatory cam member 93 under the control of, and operated mechanically by suitable and well-known means by, the operator of the vehicle. It will be noted from Fig. 7 that the arms 94 and 95 for the shoes 76 and 90 pass between or over each other in spaced relation, to permit independent movement of each set of shoes. It will also be noted from Fig. 8 that the brake cylinder 83 is disposed between the hub 96 of the spider 78 and one of the manually-operated shoes 90.

With the construction shown in Figs. 7 and 8, when fluid-pressure is introduced between the two pistons of the motor, the shoes 76 are moved into braking engagement with the drum and if further braking is desired the turning of the cam 93 by the operator serves to apply the shoes 90.

With the above construction it is to be noted that the brake member, either band or shoes, is held in proper alinement relative to the drum and that the application of the thrust through the pins, associated as they are directly with the pistons, relieves them of lateral strains and thus prevents uneven wear of the cup leathers or sealing means, so that the motor will remain in service for long periods of time without liability of leakage.

I desire it to be understood that this invention is not to be limited to any specific form or arrangement of parts except in so far as such limitations are specified in the claims.

What I claim as my invention is:

1. In brake mechanism having a revoluble brake-drum and a brake engageable with said drum, the combination of brake-applying means including a fluid-pressure-operated motor having a cylinder and a piston having a head and a rod working in said cylinder, means cooperating with said rod for maintaining said brake in alined position, and self-centering means, independent of said rod, for transmitting the thrust of said piston.

2. In brake mechanism of the type described, the combination of a pair of manually-operated brake shoes having a channel section and a pair of fluid-pressure-operated brake shoes straddling each other, of a brake drum cooperating with each set of shoes, brake shoe supporting means within said drum, a fluid-pressure-operated motor associated with said last-named shoes and including a brake cylinder associated with said supporting means and disposed within the drum, and extending into the channel of one of said manually-operated brake shoes.

In testimony whereof I affix my signature.

NIELS A. CHRISTENSEN.